(12) United States Patent
Galbiati

(10) Patent No.: US 7,184,288 B2
(45) Date of Patent: Feb. 27, 2007

(54) SYSTEM FOR CONTROLLING THE DISSIPATED POWER SUPPLY OF A POWER STAGE WORKING IN A MIXED LINEAR/PWM MODE AND DRIVING AN ELECTROMAGNETIC LOAD

(75) Inventor: Ezio Galbiati, Agnadello (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 63 days.

(21) Appl. No.: 11/061,107

(22) Filed: Feb. 18, 2005

(65) Prior Publication Data

US 2005/0185434 A1 Aug. 25, 2005

(30) Foreign Application Priority Data

Feb. 25, 2004 (IT) .......................... MI2004A0333

(51) Int. Cl.
*H02M 3/5387* (2006.01)
(52) U.S. Cl. ........................................ 363/132; 363/98

(58) Field of Classification Search ................ 330/251, 330/207, 10, 11, 69, 297, 303; 455/126, 455/115; 363/39, 74, 98, 132, 17
See application file for complete search history.

(56) References Cited

U.S. PATENT DOCUMENTS 5,075,634 A * 12/1991 French ........................ 330/146
6,476,674 B2 * 11/2002 Smedegaard-Pedersen et al. ........................... 330/251

* cited by examiner

*Primary Examiner*—Rajnikant B. Patel
(74) *Attorney, Agent, or Firm*—Hogan & Hartson LLP

(57) ABSTRACT

The invention relates to a system for controlling the power dissipated by a power stage working in mixed Linear/PWM mode, for driving an electromagnetic load, the power stage comprising a power amplifier incorporating a bridge-like circuit, with a half bridge controlled in PWM mode and another half bridge controlled in linear mode, respectively by a converter block and by an error amplifier and wherein the electromagnetic load is crossed by a current and generates an electromotive force, the control system further comprising a first amplifier of a voltage drop, calculated on a sensing resistance of the electromagnetic load, whose output signal is further applied by a second amplifier.

Advantageously, according to the invention, the Linear half bridge is controlled directly by an input voltage drawn from an input node outside the current control loop.

8 Claims, 5 Drawing Sheets

SYSTEM FOR CONTROLLING THE DISSIPATED POWER SUPPLY OF A POWER STAGE WORKING IN A MIXED LINEAR/PWM MODE AND DRIVING AN ELECTROMAGNETIC LOAD

BACKGROUND OF THE INVENTION

1. Field of the Invention

The present invention relates to a system for controlling the power dissipated by a power stage working in a mixed Linear/PWM ("Pulse Width Modulation") mode, for driving an electromagnetic load.

More specifically, the invention relates to a system of the above type comprising a power amplifier incorporating a bridge-like circuit, with a half-bridge controlled in PWM mode and another half bridge controlled in linear mode, respectively by a converter block and by an error amplifier, the electromagnetic load being crossed by a current and generating an electromotive force, the control system further comprising a first amplifier of a voltage drop calculated on a sensing resistance of the electromagnetic load, and a second amplifier for the amplification of the output signal of the above first amplifier.

More particularly, the invention relates to a system for controlling the power dissipated by a power stage working in mixed Linear/PWM mode, for driving an electromagnetic load, in a bridge-like transconductance amplifier. The following description is made with reference to this field of application for convenience of illustration only.

2. Description of the Related Art

Systems for driving an electromagnetic load by means of a power stage are known wherein the driving is realised in different modes: linear, Pulse Width Modulation (PWM), mixed linear/PWM; in consideration thereof, a power stage can be of the linear type, also called class AB, in Pulse Width Modulation (PWM), also called class D or mixed linear/PWM, also called class H-DAB.

A known solution for realising a driving system in mixed linear/PWM mode is contained in European patent EP1339163 assigned to the assignee hereof.

This solution is hereafter described with reference to FIGS. 1 and 2.

FIG. 1 shows a power amplifier 1 comprising a bridge-like circuit 2 which drives an electromagnetic load, for example a Voice Coil Motor ("VCM") in a mixed Linear/PWM mode. The bridge-like circuit 2 receives at its input a first control signal, in particular a linear IN_LIN signal, a second PWM control signal, in particular an IN_PWM signal, and two voltages, a first supply voltage Vm and a second supply voltage, in particular a ground ("GND") voltage.

The bridge-like circuit 2 comprises two pairs of parallel transistors; in the prior art example of FIG. 1, the transistors are of the MOS type.

The first pair of transistors is placed in the half bridge driven in PWM mode of the bridge 2, indicated with 2a, and it comprises a first transistor TR1 and a second transistor TR2 which receive, at the respective control terminals (gates) G1 and G2 the IN_PWM signal, directly on G1 and in inverted form on G2, by means of an inerter N1. A first conduction terminal of the first transistor TR1, in particular the drain terminal coincides with the supply terminal Vm of the bridge-like circuit 2, whereas a second conduction terminal, in particular the source terminal coincides with a first conduction terminal of the second transistor TR2, in particular the drain terminal. The common terminal is indicated with OutM. A second conduction terminal, in particular the source terminal of the second transistor TR2 coincides with the ground terminal GND.

The second pair is placed in the half bridge driven in linear mode of the bridge 2, indicated with 2b, and it comprises a third transistor TR3 and a fourth transistor TR4 which receive at the respective control terminals (gates) G3 and G4 the signal IN_LIN, amplified by a linear amplifier AB1 in class AB. A first conduction terminal of the third transistor TR3, in particular the drain terminal coincides with the supply terminal Vm of the bridge-like circuit 2, whereas a second conduction terminal, in particular the source terminal coincides with a first conduction terminal of the fourth transistor TR4, in particular the drain terminal. The common terminal is indicated with OutP. A second conduction terminal, in particular the source terminal of the fourth transistor TR4 coincides with the ground terminal GND.

The outputs of the bridge-like circuit 2 are identified by nodes OutP and OutM. The signals generated by such bridge-like circuit 2 drive the above motor VCM, which is crossed by a current $I_{VCM}$ in the range of time wherein it is enabled. In other words, the voltage difference between the two output signals of the bridge-like circuit 2, calculated in the points OutM and OutP, is the voltage applied to the motor VCM.

A current sensor, for example a sensing resistance Rs is inserted in series to the motor VCM.

In the absence of current in the motor VCM, two voltage values are generated at the ends M and P of the sensing resistance Rs identified by means of the signals Out1 and Out2; the two signals merge in a sense amplifier block 3, respectively at the inverting and non-inverting terminals of negatively fedback operational amplifier 4; the input signal Out2 is compared with a reference voltage value Vref, also at the input of the non-inverting terminal; an amplified Vout signal is generated at the output of the sense amplifier block 3 for providing an input value at the error amplifier block 5.

Error amplifier block 5 comprises negatively fedback operational amplifier 6 negatively fedback which receives at its non-inverting terminal (+) a reference voltage value Vref and at its inverting terminal (−) the Vout value compared with a reference voltage value Vin, at the input of the same block 5; the compared signal is amplified by amplifier e and filtered by the error amplifier 5.

The resulting error signal IN_LIN at the output of the above block 5 and at the input of the bridge-like circuit 2 contains the information for the closure of the current control loop $I_{VCM}$ of the VCM motor.

The current control loop $I_{VCM}$ of the VCM motor comprises both the PWM half-bridge 2a and the linear one 2b of the circuit, being both part of the bridge-like circuit 2.

The signal IN_LIN is applied at the input of a converter block PWM CONV which produces the corresponding signal IN_PWM in pulse width modulation for driving the PWM half-bridge 2a of bridge 2 of power amplifier 1.

The linear signal IN_LIN, moreover, suitably amplified by a linear AB1 amplifier in class AB, drives, without any conversion, the linear half bridge 2b of the above bridge 2 of power amplifier 1.

With respect to a completely linear operation which would occur by using two half-bridges with linear power stages of class AB, the dissipated power is lower.

Unfortunately, although advantageous under several aspects, this solution has a serious drawback. In fact, the dissipated power is lower than that dissipated by a system completely driven in linear mode, but it is however much higher than that dissipated by a system completely driven in PWM (100% PWM).

A quantification of this drawback is reported in the diagram of FIG. 2; this figure shows the trends of the dissipated power in accordance with the current $I_{VCM}$ in the VCM motor in the various configurations of the power stage: class AB (linear), class H-DAB (50% linear and 50% PWM or mixed Linear/PWM) and class D (100% PWM).

As already hinted at, the power dissipation of power amplifier 1 driven in mixed Linear/PWM mode, is significantly higher than the dissipation calculated by using a power amplifier 1 driven in 100% PWM mode.

What is desired is a system for controlling the power dissipated by a power stage, having such structural and functional characteristics to allow a reduction of the power dissipated for driving an electromagnetic load in mixed linear/PWM mode, overcoming the limits and/or the drawbacks of the prior art.

SUMMARY OF THE INVENTION

According to an embodiment of the present invention, the half-bridge controlled in linear mode is removed from the current control loop of the VCM motor so that it reaches saturation for lower values than the controlled current.

According to an embodiment of the present invention, a control system and power stage operating in a mixed linear/PWM mode includes a power amplifier including a PWM-controlled half-bridge and a linear-controlled half-bridge, an electromagnetic load and sensing resistor coupled between the PWM-controlled half-bridge and the linear-controlled half-bridge, a first amplifier for amplifying a voltage across the sensing resistor, and a second amplifier for receiving an input voltage and an output voltage from the first amplifier, the second amplifier being coupled to the PWM-controlled half-bridge to establish a current control loop, and wherein the linear-controlled half-bridge is controlled directly by the input voltage outside the current control loop. A PWM converter block is interposed between the output of the second amplifier and the input of the PWM-controlled half-bridge. A third amplifier has an input for receiving the input voltage, an output coupled to an input of the linear-controlled half-bridge, and a control input for receiving a control signal. A class AB linear amplifier is interposed between the output of the third amplifier and the input of the linear-controlled half-bridge. The power dissipated by the power stage is controlled by varying the central operation point of the linear-controlled half-bridge. The variation of the central operation point of the linear-controlled half bridge depends on a current flowing through the electromagnetic load in response to the gain of the third amplifier.

The characteristics and advantages of the system according to the invention will be apparent from the following description given by way of indicative and non-limiting example with reference to the annexed drawings.

DETAILED DESCRIPTION

Figure 3:
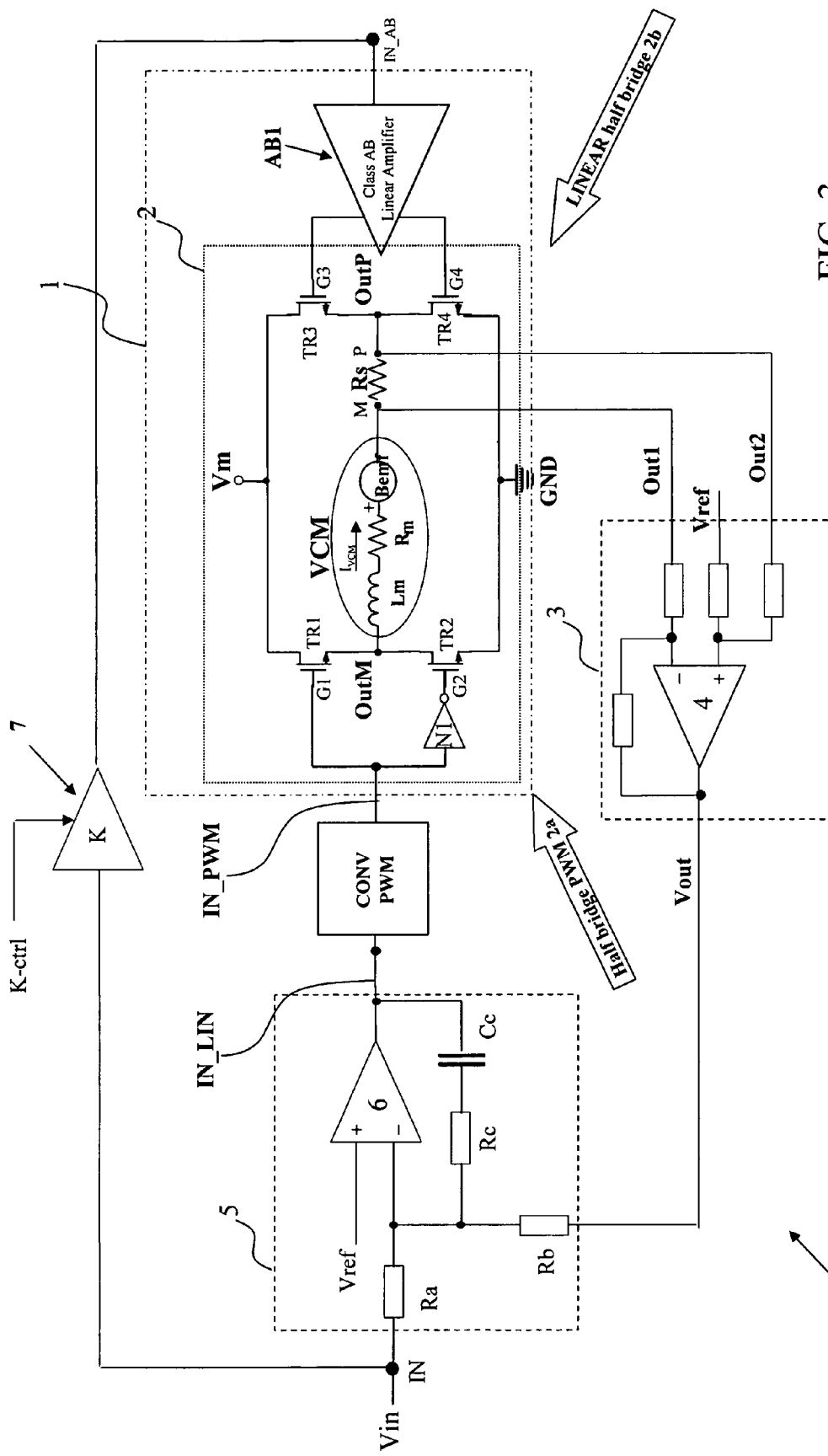
FIG. 3 schematically shows a bridge-like power amplifier, driven in a mixed Linear/PWM mode, with a current control loop, realised according to the present invention.

With reference to the drawings, and in particular to the example of FIG. 3, 10 globally and schematically shows the block diagram of a preferred embodiment of the system of the present invention.

Figure 1:
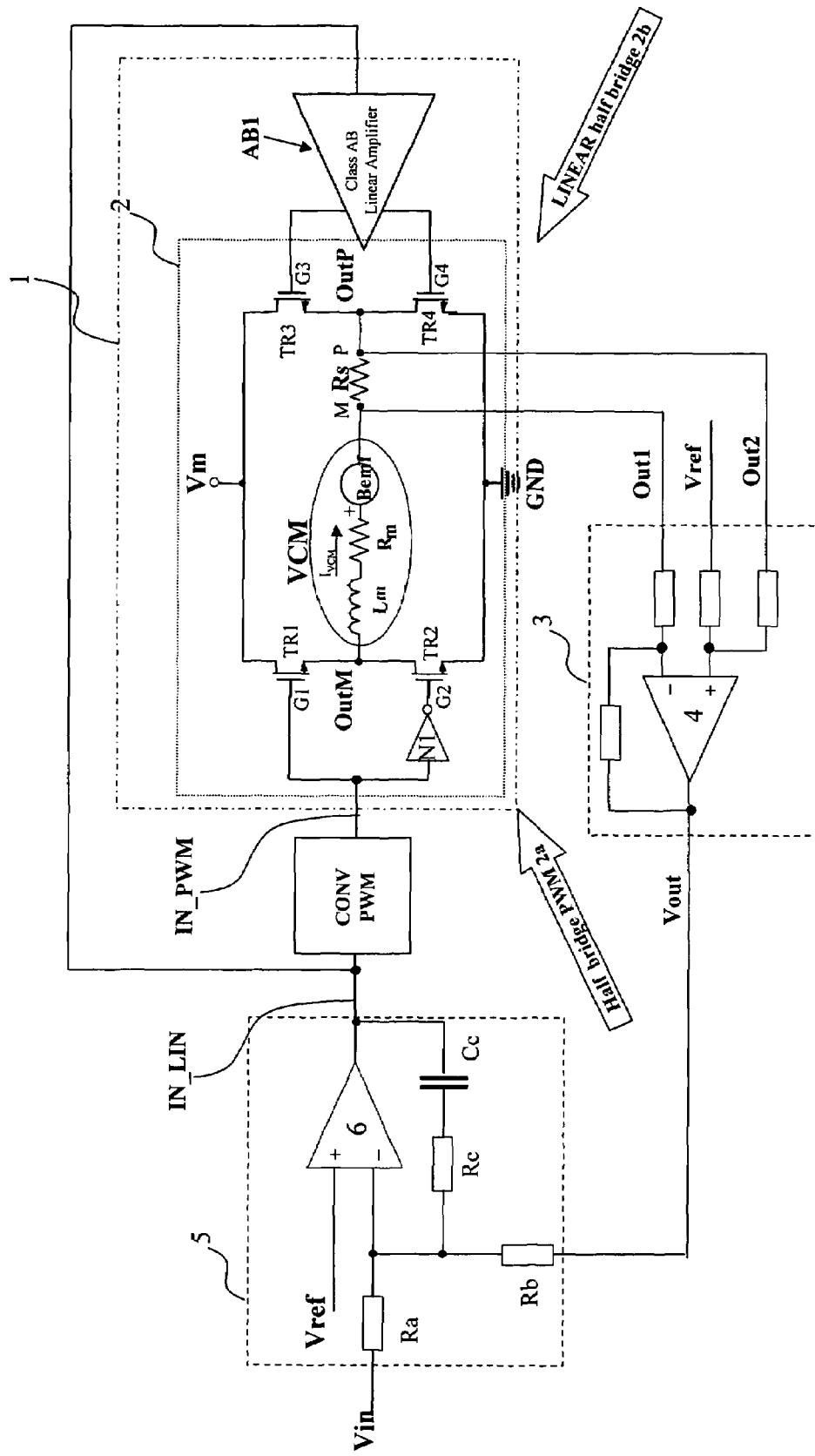
FIG. 1 schematically shows a bridge-like power amplifier, driven in a mixed Linear/PWM mode, with a current control loop, realised according to the prior art.
Figure 2:
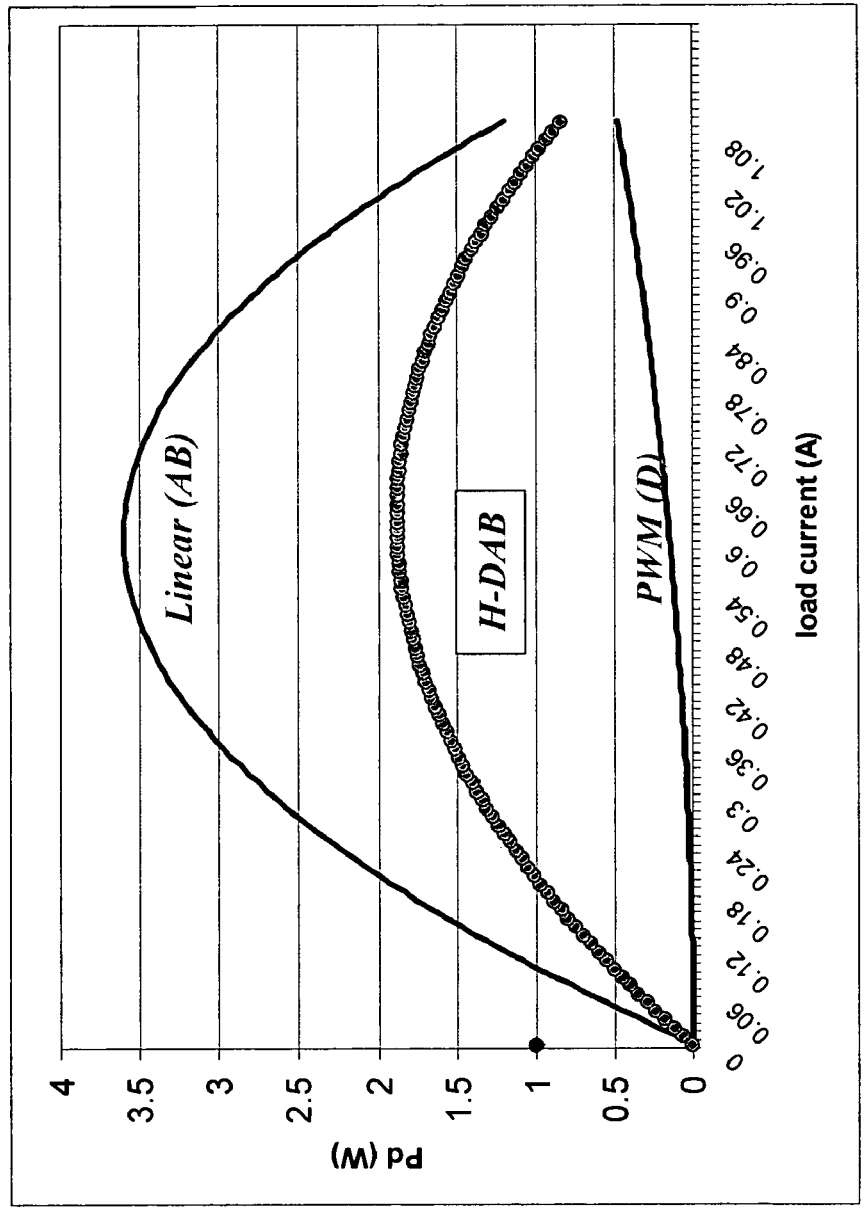
FIG. 2 shows a diagram comparing the power dissipated by different types of power amplifiers, in accordance with the current in the load, according to the prior art.

In FIG. 3, components and signals being already present in FIG. 1 and having the same structure and operation, are given the same references as previously used.

FIG. 3 shows a power amplifier globally indicated with 1, comprising a bridge-like circuit 2, which drives an electromagnetic load, for example a Voice Coil Motor VCM, in a mixed Linear/PWM mode; a voltage value proportional to the current circulating in the motor VCM is brought back to the input of a signal amplifier block 3 to be amplified and outputting a Vout signal to an error amplifier block 5.

Block 5, as previously described, comprises an operational amplifier 6 which receives at its non-inverting terminal (+) a reference voltage value Vref and at its inverting terminal (−) the Vout value compared with a reference voltage value Vin, at the input of the same block 5; at the output an amplified signal IN_LIN is produced.

According to the present invention, the control loop of the current Ivcm of the motor VCM comprises only the half bridge 2a with PWM driving of the bridge-like circuit 2. For this purpose, a further conduction path is provided between an input node IN of the error amplifier 5 and an input node IN_AB of the amplifier AB, for supplying the linear half bridge 2b and wherein an amplifier 7 with gain K is inserted and controlled by a control signal K-ctrl.

In the present invention a current control loop has been realised, which exploits the characteristics of an amplifier in class H-DAB wherein only the PWM-controlled half-bridge 2a is inside the control loop of the current $I_{VCM}$ and is controlled by the output IN_LIN of the error amplifier block 5. The half bridge 2b controlled in linear mode is out of the current loop and is directly controlled by the input voltage Vin which, besides supplying the error amplifier block 5 with an input value, is amplified through the amplifier 7 with controlled gain K by a control signal K-Ctrl.

The result obtained is that the PWM-controlled half-bridge 2a has a control function of the current $I_{VCM}$, whereas the half-bridge 2a controlled in LINEAR defines the working point of the half-bridge itself in accordance with the input signal Vin and thus in accordance with the controlled current, since the system represents a transconductance amplifier wherein the current in the load is directly proportional to the input voltage Vin.

The absence of the current control loop of the half-bridge 2b controlled in linear mode allows a remarkable reduction of the dissipated power of the amplifier in class H-DAB and allows the half-bridge 2b of the power stage driven in the linear mode to work far from the point Vm/2 or to reach the saturation for lower values of the controlled current $I_{VCM}$.

Vref is the reference voltage for the current loop, and the condition of zero current occurs for Vin=Vref, in this case the central point of the half bridge 2b controlled in LINEAR mode is set at Vm/2 whereas the central point of the half bridge 2a controlled in PWM mode has a duty cycle regulated at 50% of the current loop for maintaining the current under control.

By varying the value of Vin with respect to the reference Vref for controlling a certain current in the load (in the positive or negative direction) the current loop reacts in accordance with the transconductance gain by suitably varying the duty cycle of the output of the half-bridge 2a controlled in PWM mode, whereas the working point of the output of the half-bridge 2a controlled in linear mode is shifted towards the ground GND or towards Vm in accordance with the input voltage Vin and with the gain K of the amplifier 7.

As previously described, for decreasing the power dissipated by the output stage in class H-DAB it is necessary that the central point of the linear half-bridge 2b reaches saturation as soon as possible.

In a preferred embodiment of the system of the present invention, MOSFET transistors are used.

With the linear stage in complete saturation the power dissipated by half-bridge 2b in linear mode is dependant on the resistance RsdON calculated between the drain and source terminals of the MOSFET and on the $I_{VCM}$ current in the load; the following relation is valid:

$$PdLINsat = RdsON * I_{VCM}^2$$

and thus surely lower with respect to the power dissipated by the linear stage outside the saturation area which is:

$$PdLIN = Vds * I_{VCM},$$

where Vds represents the voltage calculated between the drain and source terminals of a MOSFET.

In the preferred embodiment of the system according to the present invention which has been just described, the working point of the linear stage can be shifted in accordance with the input voltage Vin and with the gain K of the amplifier 7 and in an independent way from the current $I_{VCM}$ controlled in the load VCM.

According to the present invention, once the transconductance value of the current loop has been set, the gain of amplifier 7 can be varied through the control signal K-Ctrl, for determining at which current value in the load the linear half bridge 2b reaches full saturation and as a consequence dissipates less power.

Even if the linear half bridge 2b reaches saturation, the linearity and the precision of the current control are however ensured by the PWM half-bridge 2a.

Figure 4:
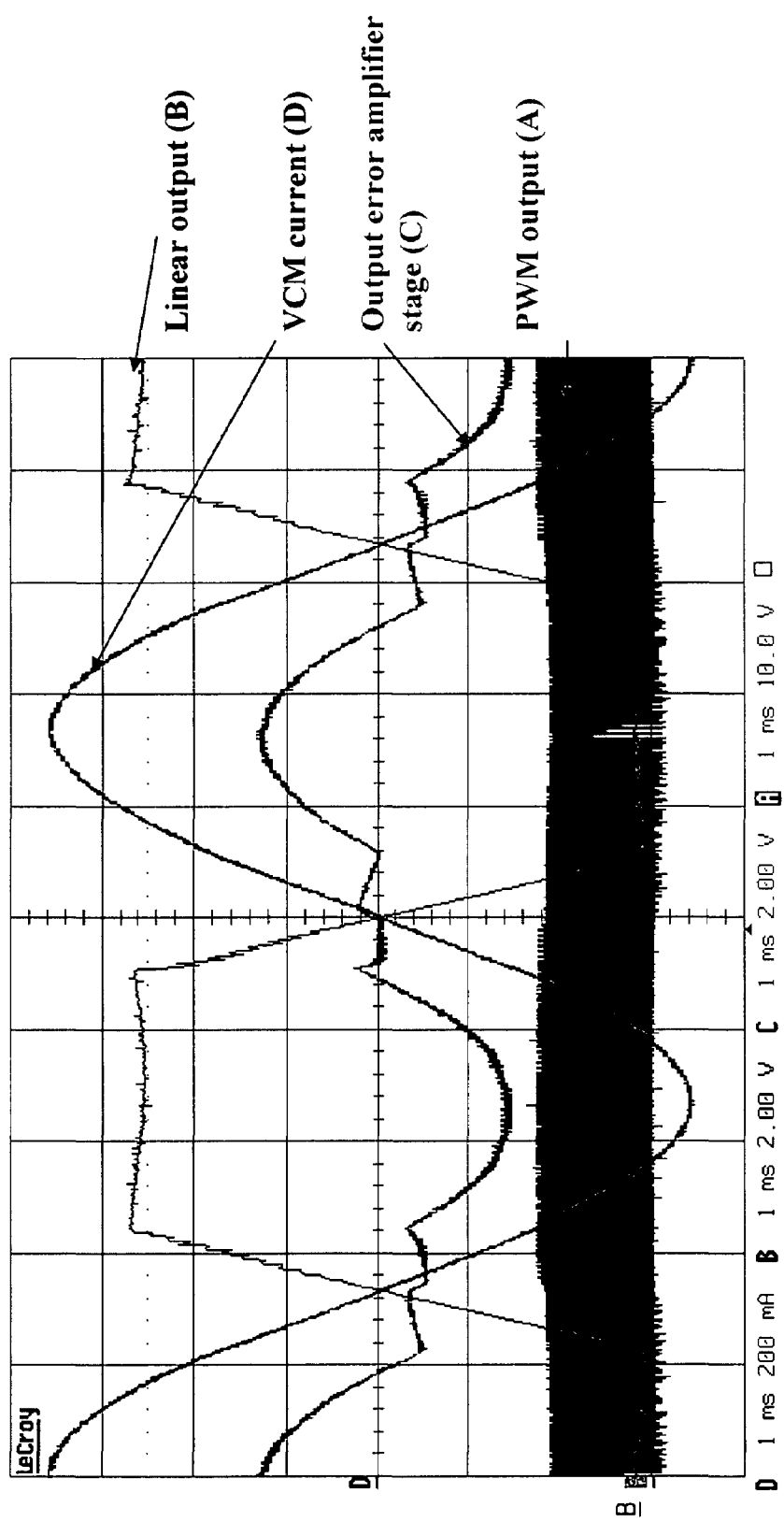
FIG. 4 shows the voltage and current waveforms obtained by an application using the system of the present invention.

FIG. 4 schematically shows voltage and current waveforms obtained by an application which uses the system of the present invention. Y-axis units for traces A, B, C and D of FIG. 4 are in 10v, 2v, 2v and 200 mA blocks, respectively. The zero reference for traces A, B and C is at B, while the zero reference for trace D is at D. X-axis units for all traces are 1 ms time blocks.

In the reported example, the gain K has been regulated so as to bring the linear half bridge 2b in saturation when the current controlled by the current loop is of 300 mA.

In this example, the transconductance amplifier controls one sinusoidal current in the load of about +/−700 mA; it can be noted that even if the half bridge 2b controlled in linear mode reaches the saturation when the current in the load is of about +/−300 mA, the linearity of the system is ensured by the current loop which controls the duty cycle of the half bridge PWM 2b, maintaining the sinusoidal trend of the current in the load.

Figure 5:
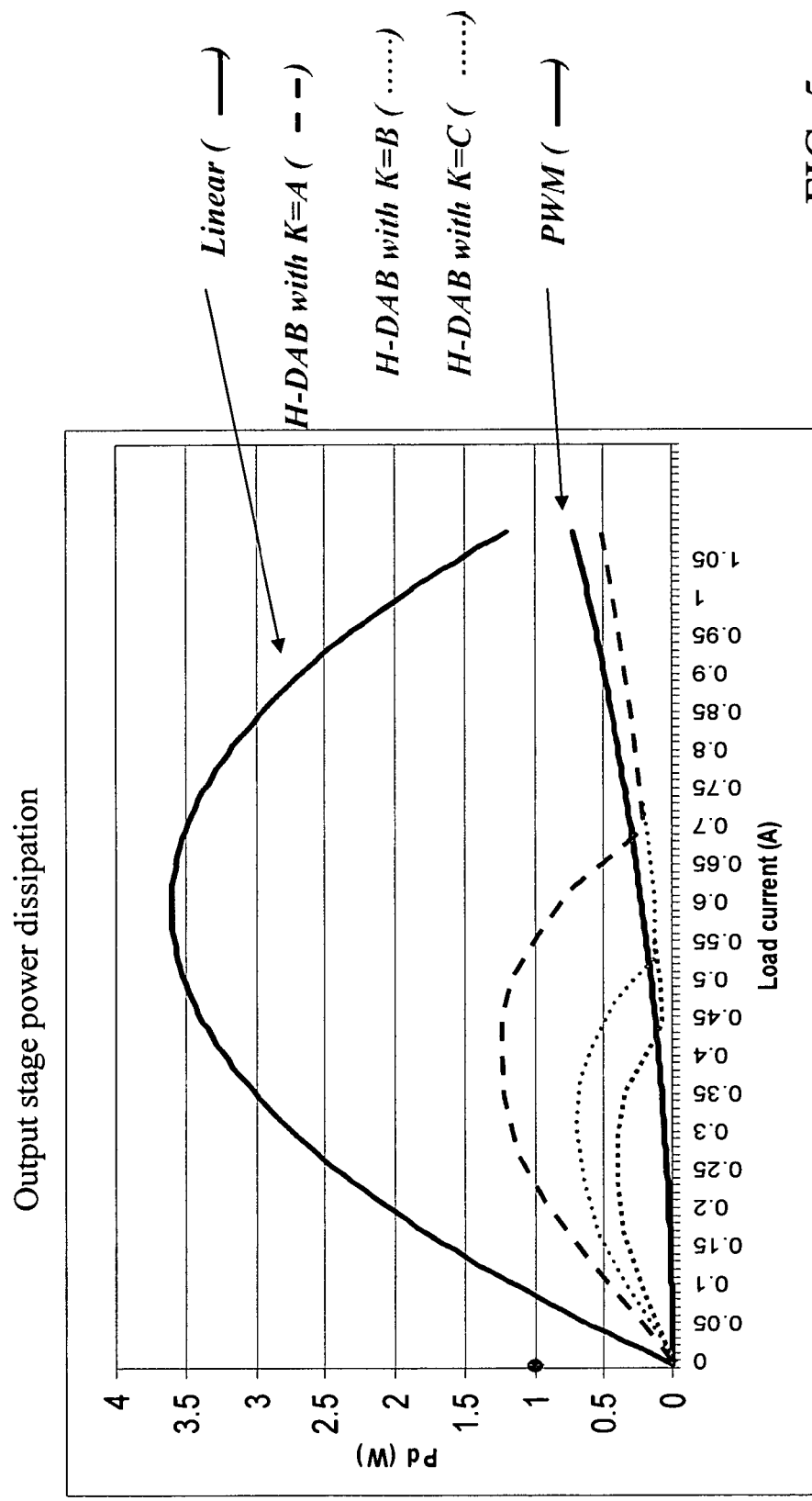
FIG. 5 schematically shows a comparison between the power dissipated by different power stages realised with different typologies and with different gain values of the amplifier.

FIG. 4 shows in detail the trends of the current in the load, of the output voltage of the linear half bridge, of the output voltage of the half bridge PWM and of the output voltage of the error amplifier. FIG. 5 schematically shows a comparison between the dissipated powers in power stages in class AB, PWM and class H-DAB with three different gain K values of the amplifier 7, where the gain A is the lowest B is the intermediate and C is the highest.

From the figure it is clear that, once the transconductance gain of the current control value is established, it is possible to vary and optimise the power dissipated by a power stage in class H-DAB, by varying only the gain K.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

The invention claimed is:

1. A control system and power stage operating in a mixed linear/PWM mode comprising:
    a power amplifier including a PWM-controlled half-bridge and a linear-controlled half-bridge;
    an electromagnetic load and sensing resistor coupled between the PWM-controlled half-bridge and the linear-controlled half-bridge;
    a first amplifier for amplifying a voltage across the sensing resistor;
    a second amplifier for receiving an input voltage and an output voltage from the first amplifier, said second amplifier being coupled to the PWM-controlled half-bridge to establish a current control loop, and wherein the linear-controlled half-bridge is controlled directly by the input voltage outside the current control loop; and
    a third amplifier having a controlled gain, an input for receiving the input voltage, and an output coupled to an input of the linear-controlled half-bridge.

2. The control system and power stage of claim 1 further comprising a PWM converter block interposed between an output of the second amplifier and an input of the PWM-controlled half-bridge.

3. The control system and power stage of claim 1 wherein the third amplifier further comprises a control input for receiving a control signal.

4. The control system and power stage of claim 1 further comprising a class AB linear amplifier interposed between the output of the third amplifier and the input of the linear-controlled half-bridge.

5. The control system and power stage of claim 1, wherein the power dissipated by said power amplifier is controlled by varying the central operation point of the linear-controlled half-bridge.

6. The control system and power stage of claim 5, wherein the variation of the central operation point of the linear-controlled half bridge depends on a current flowing through said electromagnetic load in response to the gain of said third amplifier.

7. A method of controlling a power amplifier including a PWM-controlled half-bridge and a linear-controlled half-bridge comprising:

establishing a current control loop through a load coupled between the PWM-controlled half-bridge and the linear-controlled half-bridge, a first amplifier, and a second amplifier; and controlling the linear-controlled half-bridge outside of the current control loop through an input voltage; and establishing a third amplifier path having a controlled gain between the input voltage and an input of the linear-controlled half-bridge.

8. The method of claim 7 further comprising controlling the third amplifier path with a control voltage.

* * * * *